United States Patent Office 2,823,135
Patented Feb. 11, 1958

2,823,135

LOW WATER LOSS CEMENT SLURRY COMPRISING DEXTRAN

Harry A. Toulmin, Jr., Dayton, Ohio

No Drawing. Application January 6, 1956
Serial No. 557,659

13 Claims. (Cl. 106—92)

This invention relates to aqueous cement slurries and to a method of cementing. More particularly, the invention relates to such aqueous cement slurries containing an additive which physically blocks the escape of water from the slurry but which is not itself hygroscopic and does not attract and hold moisture.

This application is a continuation-in-part of my application Serial No. 443,136, filed July 13, 1954, and now abandoned.

The problem of preventing loss of water from these cement slurries has two aspects. The water must be retained in the slurry after it is prepared and during placement thereof so that it remains in readily pumpable fluid condition and does not give up water to the formation; at the same time the slurry should give up water readily after it is placed and drying out thereof with setting of the cement in a reasonable time is desired.

Loss of water from the slurry during cementing of oil wells and in grouting cracks in masonry structures often results in dehydration of the slurry to the extent that it sets or cracks prematurely with the result that it cannot be placed in position properly because of the increase in its viscosity and the increased force required to pump or move the slurry into position.

The danger of premature dehydration is increased in the cementing of many oil wells by the modern practice of scratching or scraping the drilling mud from the wall of the well by mechanical means prior to the cementing operation and the consequent exposure of porous formations which absorb water from the slurry. This is a particular problem when oil sands are penetrated since artificial contamination of oil sands with water often causes shale-like impurities in the sand to swell and substantially reduce the permeability of the oil sand. Water lost from the slurry will tend to seal off the formation to oil flow.

When the method involves cementing with a slurry followed by gun perforation of the slurry after it has hardened, the gun perforator may not be able to penetrate the formation beyond the slurry to a depth sufficient to penetrate the region beyond that in which the shale-like impurities are swollen by the water extracted from the slurry by the formation. This results in a substantial reduction in the oil production rate of the well.

On the other hand, the problems which arise if the water is tenaciously held by or bound to some constituent of the slurry are evident.

It will be apparent that materials which are inherently hygroscopic are not wholly satisfactory for use in these aqueous cement slurries.

For instance, it has been proposed, in the prior art, to incorporate inulin in cement slurries of the present general kind. However, inulin, which is a low molecular weight (about 500) polymer, is distinctly hygroscopic in the presence of moisture, even moist air, and while it has a beneficial effect so far as preventing loss of water from the slurry is concerned, it has the disadvantage that it does not block loss of water by physical effect but due to its pronounced hygroscopicity which latter characteristic also causes it to hold water itself with such tenacity as to prolong the final drying out time for the cement after the slurry has been placed. The presence of even small amounts of inulin in the slurry tends to impede drying out of the slurry after it is placed, and setting of the cement.

One object of this invention is to provide new, improved cement slurry generally useful in grouting, in cementing the walls of wells, and for cementing pipe in wells, and which does not lose water or set prematurely.

Another object is to provide a new and improved cement slurry of low water loss such that contamination of the formation by water absorbed from the slurry is prevented or substantially inhibited.

A further object is to provide a cement slurry for use in oil wells and which does not lose water to the extent that the oil production rate of the well is appreciably reduced due to contamination of the oil by water from the slurry.

An additional object is to provide a cement slurry containing a water-loss preventing additive which, due to its physical state, blocks the escape of water from the slurry, but which does not hold moisture itself to an extent to interfere with normal drying of the slurry and setting of the cement after the slurry has been placed.

Various other objects and advantages of the invention will be apparent from the following description and the claims appended hereto.

The objects of the invention are achieved by incorporating in the aqueous cement slurry a small but effective amount of dextran or of the mixture of dextran and fructose naturally produced by the action of dextran-synthesizing microorganisms on sucrose.

The dextran used is water-dispersible and has, as an essential requirement, a molecular weight of at least 5000 and between 5000 and that of native, unhydrolyzed, microbiologically produced dextran which is estimated to be in the millions. The molecular weights given are determined by light scattering measurements.

The dextran is biosynthesized from sucrose by microorganisms of the *Leuconostoc mesenteroides* and *dextranicum* types such as those bearing the following NRRL (Northern Regional Research Laboratory) designations: *Leuconostoc mesenteroides* B–512, B–119, B–1146, B–1190, B–742, B–1191, B–1196, B–1208, B–1216, B–1120, B–1144, B–523; *Streptobacterium dextranicum* B–1254 and *Betabacterium vermiforme* B–1139.

The procedure is to introduce a culture of the microorganism, or the enzyme filtered from the culture, into an aqueous sucrose-bearing nutrient medium containing appropriate inorganic salts and nitrogenous materials, and incubate the mass until the dextran is biosynthesized in maximum yield, after which the dextran is precipitated from the fermentate by the addition of a water-miscible aliphatic alcohol or ketone, optionally suitably purified and reduced to particulate condition.

The "native" dextran thus obtained is normally characterized by a very high molecular weight estimated to be in the millions, and has the following characteristics:

(a) The anhydroglucose units are joined predominantly by the unique 1,6 linkages.

(b) Dextran does not contain a free $CH_2OH$ group in the repeating structure and in this respect differs sharply from other polysaccharides such as starch, dextrin, inulin, cellulose.

(c) Dextran is amorphous.

(d) Does not give the iodine test.

(e) Is water-dispersible and may be readily soluble in cold water even in the native state.

(f) Dextran is a bacterial product.
(g) Not susceptible to amylase enzyme action.
(h) Resistant to amolytic bacterial enzymatic degradation.
(i) Partial antigen (haptane).
(j) Synthesis does not require mediation of phosphorylated sugar.

It may be incorporated in the cement slurry at the normally high "native" molecular weight or it may be partially hydrolyzed to any molecular weight between the initial weight and 5000.

Also, the dextran may be biosynthesized under special controlled conditions known to result in a native dextran having a molecular weight lower than that of dextran biosynthesized under the conventional conditions.

Inoculation of the sucrose-bearing nutrient medium with the Leuconostoc bacteria or the enzyme thereof results in the production of a mixture of fructose and dextran, the fructose being a by-product of the sucrose conversion to dextran. Under the usual, conventional conditions for effecting the biosynthesis of the dextran and involving the addition of a water-miscible alcohol or ketone to the fermentate, the dextran is precipitated substantially selectively, the fructose remaining in the fermentate.

It has been found, according to the invention, that the mixture of fructose and dextran produced naturally in the gross synthesis of dextran from sucrose is also particularly useful as an additive to the cement slurries for preventing or inhibiting loss of water therefrom.

While it would be within the scope of the invention to recover the dextran from the fermentate and mix it with an appropriate proportion of fructose also separately recovered from the fermentate or obtained from some other source, it is more convenient and economical, and preferred, to utilize the mixture of fructose and high molecular weight native dextran as it occurs in the fermentate. The ratio of the fructose to dextran in such mixture may vary depending on the Leuconostoc strain with which the sucrose medium is inoculated, and may be from 0.5 to 2.0 to 2:0.5, by weight. Such proportions may be used. The mixture is obtained by evaporating the fermentate to a highly concentrated solution containing the fructose-dextran mixture or to dryness, and stabilizing the product of the concentration by the addition of any suitable bacteriostatic agent.

The slurry may be prepared by mixing the dry ingredients comprising hydraulic cement, inert filler material such as sand or crushed limestone, and dextran or dextran fructose mixture together, with or without additives for increasing the set time and then mixing the dry mixture with water, or the various ingredients may be separately mixed with water and then combined to form the cement slurry, provided the hydraulic cement is mixed with water immediately before the slurry is placed in position.

The term "hydraulic cement" is intended to include all mixtures which are commonly known as hydraulic cement, such as silica and alumina, or of lime and mixtures of lime, magnesia, silica and alumina and iron oxide (magnesia, for instance, may replace part of the lime, and iron oxide a part of the alumina). Hydraulic cements include hydraulic limes, grappier cements, puzzalan cements, natural cements and Portland cements. Puzzalan cements include slag cements made from slaked lime and granulated blast furnace slag. Portland cement is a preferred hydraulic cement due to its superior strength. The cement may contain the usual minor additives common to hydraulic cements such as calcium sulfate and/or calcium chloride in amounts up to 3%.

It is usually desirable, in most oil well cementing and grouting operations, to use neat cement for the added strength obtainable, but it is always possible to add any desired amount of an inert granular filling material or aggregate such as sand, ground limestone, or any of the other well-known inert aggregates as long as the amount added does not reduce the strength of the cement below the value required for the particular use.

In operations in open wells, it is generally preferred to use a neat, or "straight" cement in order to avoid the difficulty that, if inert filling material is included, it tends to become detached from the walls of the well and to mix with and dilute the slurry to the extent that it is not desirable to add any filler to the slurry to be forced into the well.

The amount of water added to the dry ingredients to form the slurry is not critical, so long as sufficient water is present to form a pumpable slurry. An excess of water over the amount necessary to render the slurry readily pumpable is not required in the present case as is necessary with known slurries in order to provide a reserve for compensating for the water lost.

Small amounts of the dextran, between 0.1% and 5% by weight based on the cement weight are effective in reducing the water loss of the hydraulic cement aqueous slurries, with or without inert filler material. The molecular weight influences the amount of dextran which is most effective. Thus with native, high molecular weight unhydrolyzed, microbiologically produced dextran, like native L. m. B-512 dextran, such as 0.1% to 0.5% are effective, whereas when dextran of lower molecular weight, such as a partially hydrolyzed dextran, is used amounts of 1.0% to 3.0% or up to 5.0% may be preferred. The amount of dextran used is not critical but obviously it is advantageous to use only the amount required to inhibit the water loss, as determined by the standard tests.

The dried fermentate comprising the stabilized mixture of fructose and dextran may be mixed with cement ingredients or the highly concentrated or dried fermentate may be added to the slurry. Amounts are added to provide in the slurry from 0.1% to about 5.0%, preferably 0.1% to 0.5% of the native dextran on the dry cement weight.

The non-hydroscopic dextran of high molecular weight (minimum 5000) and the native dextran present in the dextran-fructose mixture inhibits or prevents loss of water from the slurry because of the blocking effect of the large molecules thereof, and does not tend to hold moisture tenaciously once the slurry has been placed and the cement is allowed to dry. The effect is due to the molecular size and not to any hygroscopic property inherent in the dextran. Any tendency of the fructose in the fructose-dextran mixture to hold water is offset by the native extremely high molecular weight dextran associated therewith.

The following examples are given to illustrate the invention, it being understood that these examples are not intended to be limitative.

*Example I*

A Portland cement slurry is made up with 8 pounds of cement to the gallon of slurry. About 0.5% of native L. m. B-512 dextran by weight (based on the dry Portland cement) is added. The dextran has a molecular weight estimated in the millions, soluble in cold water.

The effectiveness of the native dextran in inhibiting loss of water from the slurry is tested according to the test procedure for drilling muds described in A. P. I. code 29. The slurry loses only about 15 ccs. of water in 5 minutes compared to a loss of 105 ccs. of water in one minute, 15 seconds, from a slurry similar but not containing the dextran.

*Example II*

The mixture of fructose and dextran obtained by inoculating a sucrose-containing nutrient medium with L. m. B-512 (whole culture) and incubating the mass until dextran is produced in maximum yield, is obtained in stable dry form by concentrating the fermentate to dryness and adding a bacteriostatic agent to the residue of the concentration. An amount of the stable dry product sufficient to provide 0.5% of the fructose-dextran mixture (ratio of fructose to dextran about 1:1) on the weight of the cement is added to a Portland cement slurry prepared as in Example I. On testing by the prescribed test (Ex. I), the slurry shows only a negligible water loss in 5 minutes and a loss of only about 15 ccs. in 10 minutes.

*Example III*

Example I is repeated, except that hydrolyzed B–512 dextran (molecular weight 20,000–200,000, average 60,000–80,000) is used in an amount of about 1.0% on the cement weight, to inhibit the loss of water from the cement slurry.

*Example IV*

Example I is repeated, except that native B–523 dextran is incorporated in the slurry in an amount of about 0.8% on the cement weight.

*Example V*

Example I is repeated, except that native B–1146 dextran is incorporated in the slurry in an amount of about 2.0% on the cement weight.

*Example VI*

A Puzzalan cement slurry is made up with 5 pounds of the slag cement to the gallon of slurry and 0.6% by weight (based on the dry cement) of hydrolyzed *L. m.* B–523 dextran (molecular weight average about 5000) is added. The dextran hydrolyzate effectively inhibits loss of water from the slurry.

In any of the examples given, the dextran or dextran-fructose mixture may be mixed dry with the cement and water added at a subsequent time to form the slurry.

Similar good results are obtained when other native, water-dispersible dextrans or hydrolyzates thereof with molecular weight down to about 5000 are present in the slurry, or when the naturally produced mixture of fructose and dextran is used.

The slurry prepared according to the invention does not contain substances other than the cement mixture except such materials as are conventionally incorporated in such slurries.

The amount of cement per gallon of slurry may vary but is usually from 5 to 15 pounds.

A cement slurry prepared as in present Example I but containing 1% of inulin for preventing loss of water loses much less water than the untreated slurry but has the disadvantage that moisture is attracted by and held by the hygroscopic inulin after the cement has set. Access of such moisture to shale-like impurities in oil sands will cause the impurities to swell and reduce the permeability of the oil sand, and tend to seal off the formation to oil flow.

Dextran being non-hygroscopic and of high molecular weight prevents loss of water from the cement slurry by virtue of the size of the molecule, or by a physical blocking. The different mechanisms by which the dextran and fructose dextran mixtures on the one hand, and inulin on the other, reduce loss of water from the slurry are not apparent from a superficial consideration of dextran and inulin. Both are hydroxylated materials. However, in dextran the repeating anhydroglucose units are joined by 1,6 linkages and dextran does not contain the free $CH_2OH$ group in the repeating (1,6) structure which free group is characteristic of starch, dextrin, inulin, cellulose. The predominating 1,6 linkages in dextran and the absence of the free $CH_2OH$ group in the repeating structure have a bearing on the fact that, unlike inulin, the dextran is non-hygroscopic. Water is given up by the dextran or dextran-fructose mixture when the cement is allowed to set.

The cement slurry containing the dextran or fructose-dextran mixture sets into a hard cement suitable for well cementing and groating after the water-loss test. This is also in contrast to the behaviour of the slurry not containing dextran or the dextran-fructose mixture.

The unmodified slurry sets, after the testing, in a cracked and weakened condition and if used for cementing a well will lose water to the formation, be dehydrated, and exhibit a premature setting or bridging effect which will require such an increase in pressure for placement of the slurry that the cementing operation will not be successful in wells having porous formations. Moreover, water lost from the slurry will contaminate such formations.

It will be understood that the examples and tests described herein are given for purposes of illustration and that various changes and modifications may be made in details in practicing the invention, including the selection of the dextran and the amount thereof used. Since such changes and modifications may be made without departing from the spirit and scope of the invention, it is not intended to limit the invention except as defined in the appended claims.

What is claimed is:

1. A cement adapted to form a fluid, pumpable slurry on the addition of water thereto consisting essentially of a mixture of hydraulic cement and a small amount, sufficient to prevent loss of water from the slurry, of a substance selected from the group consisting of (1) water-dispersible dextran having a molecular weight between 5000 and that of native, unhydrolyzed, microbiologically produced dextran and (2) mixtures of native water-dispersible dextran and fructose produced by the action of dextran-synthesizing strains of Leuconostoc on sucrose.

2. A cement adapted to form a fluid, pumpable slurry on the addition of water thereto consisting essentially of a mixture of hydraulic cement and, for inhibiting loss of water from the slurry, 0.1% to 5.0% on the dry cement weight of water-dispersible, native, microbiologically produced dextran.

3. A cement adapted to form a fluid, pumpable slurry on the addition of water thereto consisting essentially of a mixture of hydraulic cement and, for inhibiting loss of water from the slurry, a concentrate consisting essentially of the mixture of native dextran and fructose produced by the action of dextran-synthesizing strains of Leuconostoc on sucrose in an amount sufficient to provide from 0.1% to 5.0% by weight of the dextran based on the dry cement weight.

4. A cement adapted to form a fluid, pumpable slurry on the addition of water thereto consisting essentially of a mixture of Portland cement and a small amount, sufficient to prevent loss of water from the slurry, of a substance selected from the group consisting of (1) water-dispersible dextran having a molecular weight between 5000 and that of native, unhydrolyzed, microbiologically produced dextran and (2) mixtures of native water-dispersible dextran and fructose produced by the action of dextran-synthesizing strains of Leuconostoc on sucrose.

5. A cement adapted to form a fluid, pumpable slurry on the addition of water thereto consisting essentially of a mixture of Portland cement and, for inhibiting loss of water from the slurry, 0.1% to 5.0% on the dry cement weight of water-dispersible, native, microbiologically produced dextran.

6. A cement adapted to form a fluid, pumpable slurry on the addition of water thereto consisting essentially of a mixture of Portland cement and, for inhibiting loss of water from the slurry, a concentrate consisting essentially of the mixture of native dextran and fructose produced by the action of dextran-synthesizing strains of Leuconostoc on sucrose in an amount sufficient to provide from 0.1% to 5.0% by weight of the dextran based on the dry cement weight.

7. A hydraulic cement slurry consisting of a hydraulic cement, an amount of water such that the free water present is sufficient to form a flowable slurry and, for inhibiting loss of water from the slurry, a substance selected from the group consisting of (1) water-dispersible dextran having a molecular weight between 5000 and that of native, unhydrolyzed, microbiologically produced dextran in an amount of 0.1% to 5.0% on the dry cement weight, and (2) mixtures of native dextran and fructose produced by the action of dextran-synthesizing strains of Leuconostoc on sucrose in an amount sufficient to provide 0.1% to 5.0% of the dextran on the dry cement weight.

8. A hydraulic cement slurry consisting essentially of a hydraulic cement, an amount of water such that the free water present is sufficient to form a flowable slurry and, for inhibiting loss of water from the slurry, from 0.1% to about 5.0% of water-dispersible native, unhydrolyzed, microbiologically produced dextran.

9. A hydraulic cement slurry consisting essentially of a hydraulic cement, an amount of water such that the amount of free water present is sufficient to form a flowable slurry and, for inhibiting loss of water from the slurry, a mixture of native dextran and fructose produced by the action of dextran-synthesizing strains of Leuconostoc on sucrose in an amount sufficient to provide 0.1% to 5.0% of the dextran on the dry cement weight.

10. A hydraulic cement slurry consisting essentially of Portland cement, an amount of water such that the amount of free water present is sufficient to form a flowable slurry and, for inhibiting loss of water from the slurry a substance selected from the group consisting of (1) water-dispersible dextran having a molecular weight between 5000 and that of native, unhydrolyzed, microbiologically produced dextran in an amount of 0.1% to 5.0% on the dry cement weight, and (2) mixtures of native dextran and fructose produced by the action of dextran-synthesizing strains of Leuconostoc on sucrose in an amount sufficient to provide 0.1% to 5.0% of the dextran on the dry cement weight.

11. A hydraulic cement slurry consisting essentially of a Portland cement, an amount of water such that the amount of free water present is sufficient to form a flowable slurry and, for inhibiting loss of water from the slurry, from 0.1% to about 5.0% of water-dispersible native, unhydrolyzed, microbiologically produced dextran.

12. A hydraulic cement slurry consisting essentially of a Portland cement, an amount of water such that the amount of free water present is sufficient to form a flowable slurry and, for inhibiting loss of water from the slurry, a mixture of native dextran and fructose produced by the action of dextran-synthesizing strains of Leuconostoc on sucrose in an amount sufficient to provide 0.1% to 5.0% of the dextran on the dry cement weight.

13. A cement adapted to form a fluid, pumpable slurry on the addition of water thereto consisting essentially of a mixture of hydraulic cement and, for inhibiting loss of water from the slurry, a dry concentrated fermentate consisting essentially of the mixture of dextran and fructose produced by the action of dextran-synthesizing strains of Leuconostoc on sucrose, the amount of concentrated fermentate being such as to provide from 0.1% to 5.0% of the dextran based on the dry cement weight.

References Cited in the file of this patent

UNITED STATES PATENTS

| | | |
|---|---|---|
| 2,006,426 | Weiler | July 2, 1935 |
| 2,374,628 | Swayze | Apr. 24, 1945 |
| 2,429,211 | Andes | Oct. 21, 1947 |
| 2,619,181 | Lea | Nov. 25, 1952 |

UNITED STATES PATENT OFFICE

CERTIFICATE OF CORRECTION

Patent No. 2,823,135 February 11, 1958

Harry A. Toulmin, Jr.

It is hereby certified that error appears in the above numbered patent requiring correction and that the said Letters Patent should read as corrected below.

In the grant, lines 1, 2, and 3, for "Harry A. Toulmin, Jr., of Dayton, Ohio," read -- Harry A. Toulmin, Jr., of Dayton, Ohio, assignor to The Commonwealth Engineering Company of Ohio, of Dayton, Ohio, a corporation of Ohio, --; line 12, for "Harry A. Toulmin, Jr., his heirs" read -- The Commonwealth Engineering Company of Ohio, its successors --; in the heading to the printed specification, line 4, for "Harry A. Toulmin, Jr., Dayton, Ohio" read -- Harry A. Toulmin, Jr., Dayton, Ohio, assignor to The Commonwealth Engineering Company of Ohio, Dayton, Ohio, a corporation of Ohio --.

Signed and sealed this 20th day of May 1958.

(SEAL)
Attest:

KARL H. AXLINE
Attesting Officer

ROBERT C. WATSON
Commissioner of Patents